April 5, 1932.　　　W. K. HOWE　　　1,852,572
CAR RETARDER
Filed Jan. 3, 1928　　3 Sheets-Sheet 1

INVENTOR
W. K. Howe,
BY
Neil D. Preston,
his ATTORNEY

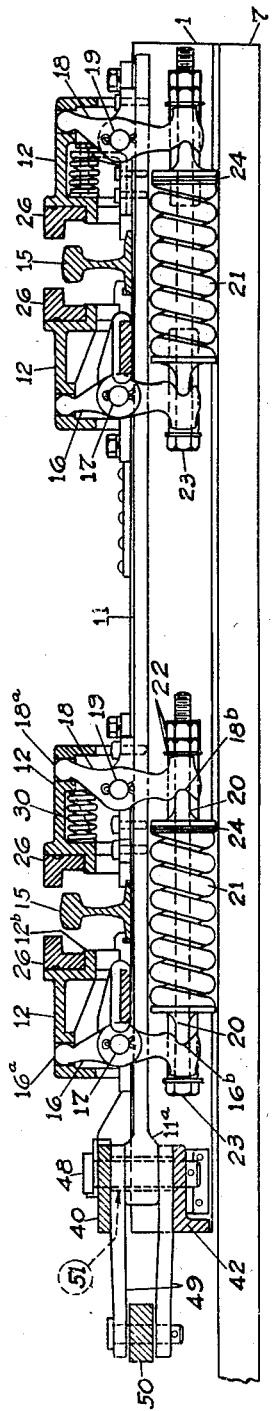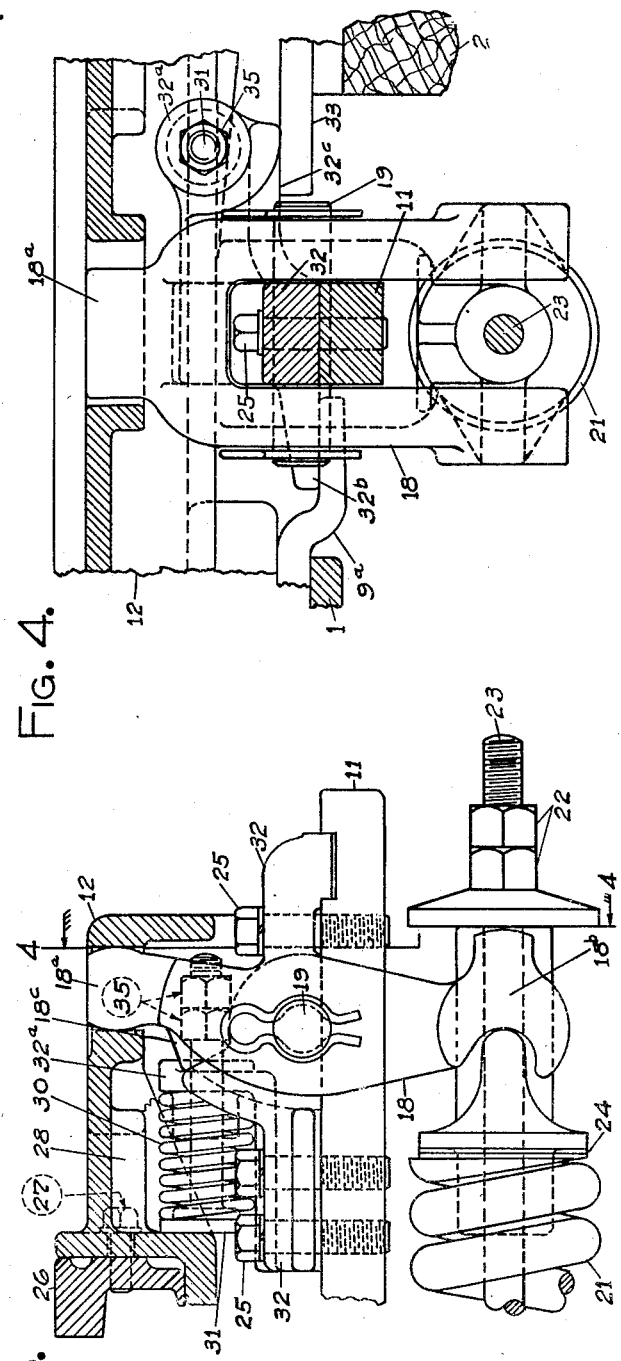

April 5, 1932. W. K. HOWE 1,852,572
CAR RETARDER
Filed Jan. 3, 1928 3 Sheets-Sheet 3
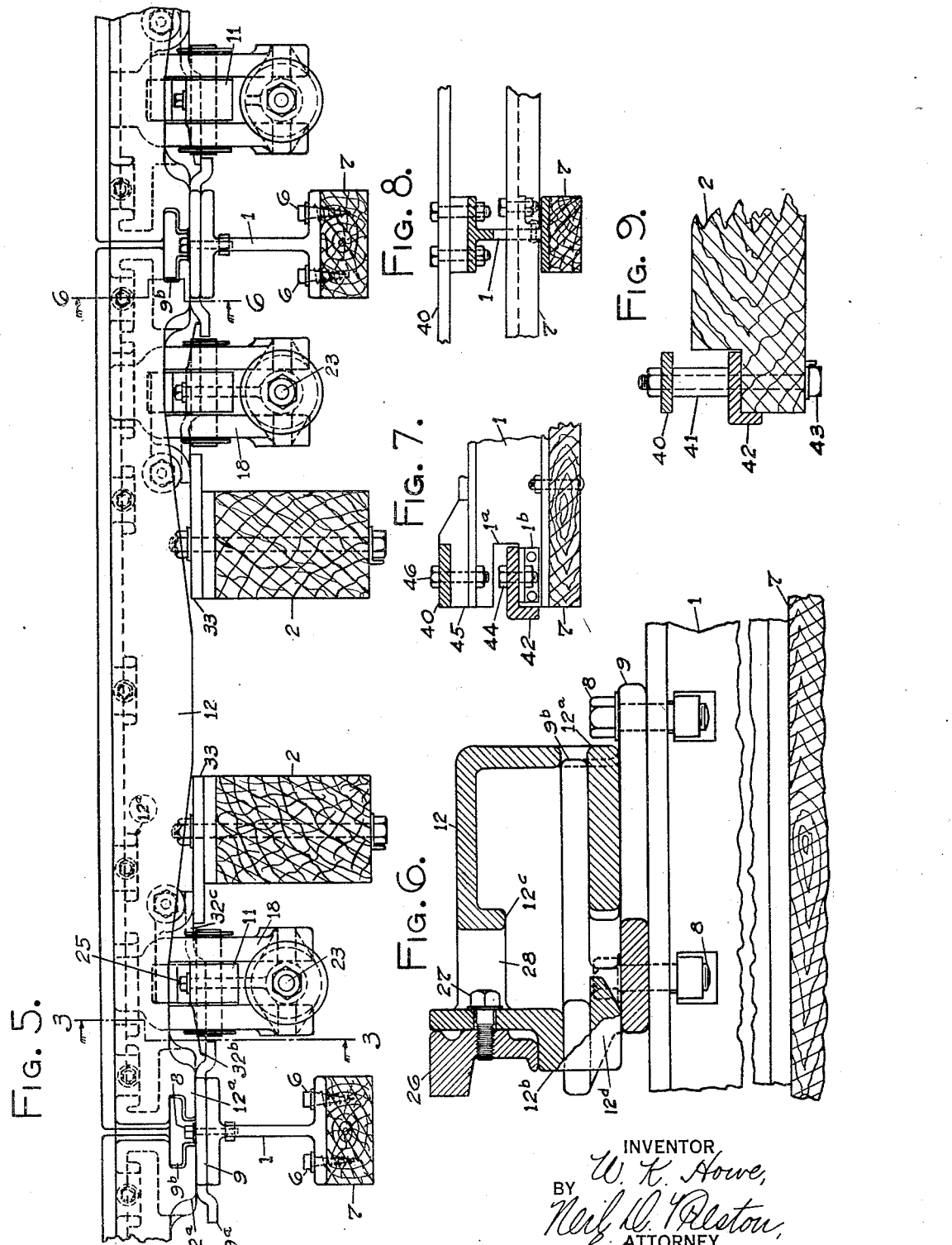

Patented Apr. 5, 1932

1,852,572

UNITED STATES PATENT OFFICE

WINTHROP K. HOWE, OF ROCHESTER, NEW YORK, ASSIGNOR TO GENERAL RAILWAY SIGNAL COMPANY, OF ROCHESTER, NEW YORK

CAR RETARDER

Application filed January 3, 1928. Serial No. 244,259.

This invention relates to car retarders of the type engaging the sides of moving car wheels.

The present invention is an improvement on the car retarders shown in my prior application Patent No. 1,757,428 dated May 6, 1930, and reference may be made to this prior application, if desired. In building a car retarder of the type mentioned there are certain conditions encountered in practice which must be carefully considered in building a practical, efficient and rugged retarder mechanism. For instance, in practice it is found that the thickness, or width, of freight car wheels varies and further that the gauge, or spacing between the wheels on a common axle, is not the same for all cars. In using a car retarder of this type, in which brake shoes are arranged on both sides of each track rail, projecting above the rails a comparatively short distance to afford clearance for braces and brake rigging, for engaging the wheels of moving cars, it is experienced that the car wheels will lift or climb out from between such brake shoes if excessive brake shoe pressures are applied. In car retarders of earlier designs of this general type it has been experienced, when cars climb out from between the brake shoes, that it is quite common for a car to be derailed and in so doing injure the car retarder apparatus and possibly the car and its loading.

In accordance with the present invention the retarder has been so designed that in the event the car wheels do climb out, they climb out only to that point at which the flange of the wheels is still kept between the brake shoes and when such car reaches the end of the retarder it will drop back onto the track rail, and no derailment is experienced even though the wheel flanges have been raised above the track rail. This is accomplished by constructing the mechanism in such a way as to relieve the pressure of the brake shoe on the inside of the wheel where the wheel flange is located, as soon as the body and tread of the wheel has climbed out from between the brake shoes. A further purpose of the present invention resides in the construction of a car retarder in which the brake shoe pressure exerted on opposite sides of a car wheel is balanced or equalized, and in which the brake shoe pressures on the two wheels mounted on the same axle of a railway truck are balanced, that is, are not materially changed in spite of variation of the spacing between the two wheels on such axle. In other words, the present invention contemplates the use of brake shoes in which not only the pressures on opposite sides of the wheels are balanced, but in which the pressures on both sides of two car wheels mounted on the same car axle are substantially balanced in spite of irregularity in the spacing of such wheels on their axle.

Another feature of the present invention resides in providing in combination with the above mentioned equalizing features rugged shoe beams having a slot at one end and a counterpart projection on the other end, which shoe beams are so assembled in the car retarder that successive shoe beams are articulated together to permit transverse movement only, so as to form a continuous flexible shoe beam, so to speak. A further feature of the present invention resides in the provision of centering or aligning springs whereby the shoe beams are maintained in alignment with the track rails adjacent which they are located in spite of the equalizing characteristics which tend to allow the shoe beams to assume positions depending on their initial position, relative friction, etc.

Other objects, purposes and characteristic features of the invention are apparent from the drawings and will be pointed out in the description hereinafter. In describing the invention in detail reference will be made to the accompanying drawings in which:—

Fig. 2 shows an enlarged section of the car retarder shown in Fig. 1 taken on the lines 2—2 of Fig. 1 as viewed in the direction of the arrows;

Fig. 3 shows the extreme right hand end of Fig. 2 on an enlarged scale showing more in detail the construction of the centering spring, which is also a sectional elevation taken on a line 3—3 of Fig. 5;

Fig. 4 is a cross-sectional side elevation of the construction shown in Fig. 3 taken on a line 4—4 of Fig. 3 as viewed in the direction of the arrows;

Fig. 5 is an enlarged side elevation of the left hand portion of the car retarder shown in Fig. 1 of the drawings;

Fig. 6 is a cross-sectional elevation taken on the line 6—6 of Fig. 5 as viewed in the direction of the arrows;

Figs. 7 and 8 are side and end elevations, respectively, showing how the anchoring plates are secured to the steel I-beam; and Fig. 9 shows how these anchoring plates are secured to the wood ties.

Figure 1:
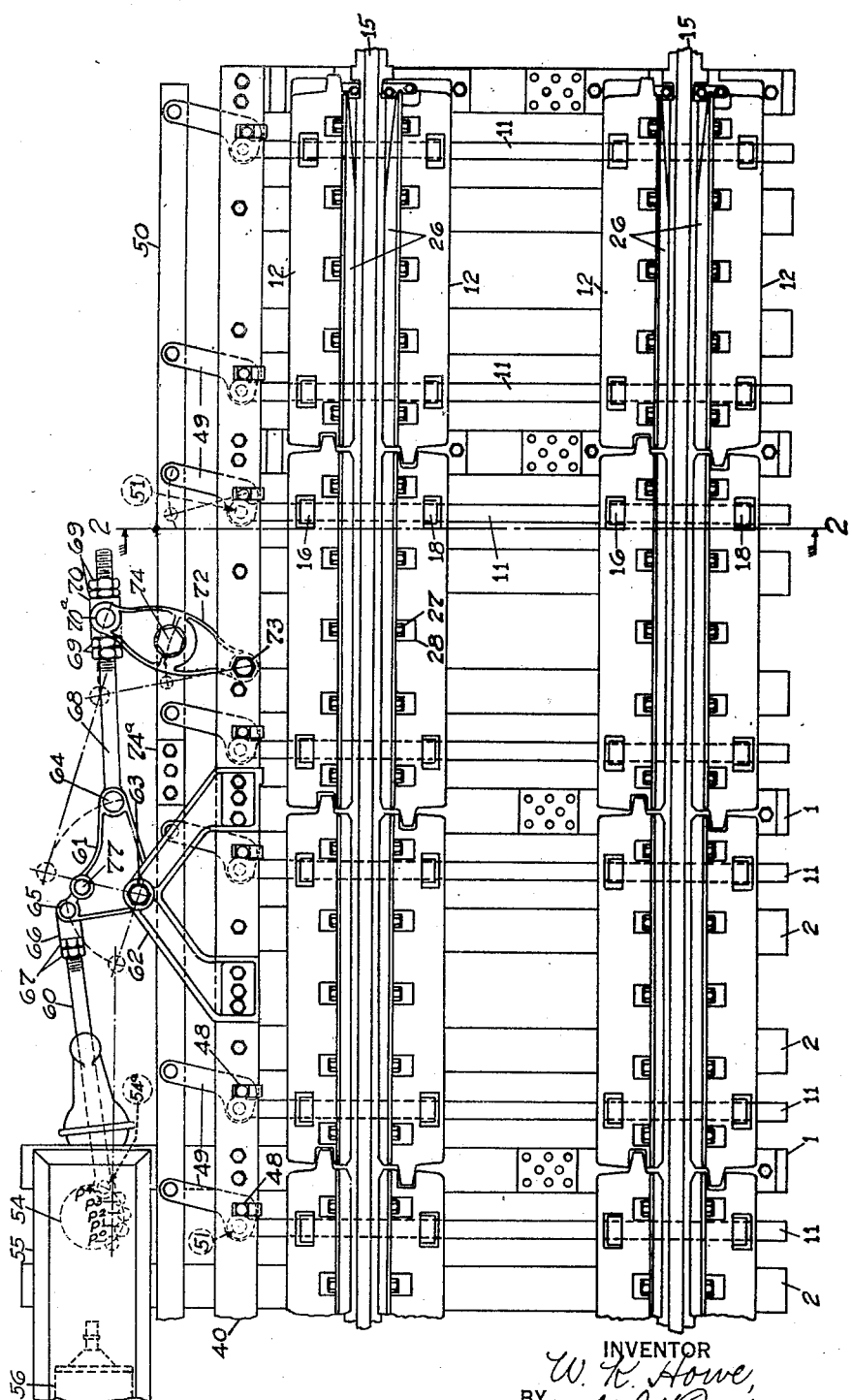
Fig. 1 shows a plan of a car retarder employing the present invention together with the power operated mechanism for operating the same.

Referring to the plan view shown in Fig. 1 of the drawings, it should be noted that every third tie comprises a structional steel I-beam 1, as more clearly shown in Fig. 5, and that the first and second tie out of each three comprise wooden ties 2. On these ties are supported the track rails 15. The I-beams 1 are fastened by lag screws 6 to cushioning ties 7 (see Fig. 5) preferably made of wood or other suitable yieldable or elastic material. On top of the I-beams 1 are fastened, as by bolts 8 chairs or, guide blocks 9, having outwardly projecting wings 9a and upwardly projecting ears 9b to provide a slidable support for the lip 32b (see Fig. 4) of bracket 32 and the associated cross bar 11 and also the ends of the shoe beams 12 (see Figs. 5 and 6).

We have thus far considered only the foundation or stubstructure of the retarder with the exception of a brief mention of the shoe beams 12 and the cross rods 11. It should be noted (see Fig. 1) that each retarder section for a two rail track includes four shoe beams 12 and two cross rods 11. Referring now particularly to Fig. 2, and remembering that the shoe beams 12 are arranged only for sliding movement toward and away from the track rail 15, this sliding movement of the shoe beams 12 is governed by the operating arm 16 pivotally supported on a fixed pivot 17 and another operating arm 18 pivotally supported on a movable pivot 19, which pivot 19 forms part of and is moved in accordance with movement of the cross rod 11. The lower ends of these operating arms 16 and 18 are provided with hook shaped seats 16b and 18b engaged by seating washers 20, between which is contained an initially compressed compression spring 21, the initial or trapped compression of which may be adjusted by the shims or spacing washers 24 and the lock nuts 22 on the bolt 23 passing through this spring 21. From this construction it appears that if one of the shoe beams 12 is pushed away from the track rail 15 that the other shoe beam 12 will be moved toward the track rail 15, this by reason of the fact that the upper ball shaped ends 16a and 18a of the operating arms 16 and 18 engage the shoe beams 12, and because the shoe beams 12 and spring 21 are permitted to float with the arms 16 and 18 about their pivotal supports 17 and 19. It also appears that if the cross rod 11 (see Fig. 2) is moved toward the left, it will move the pivot 19 rigidly fastened thereto by machine screws 25 (see Figs. 3 and 5) toward the left, and in so doing will move the right hand shoe beam 12 and the spring 21 toward the left, and through the medium of operating arm 16 movable about the fixed pin 17 will cause movement of the left hand shoe beam 12 toward the right. In other words, if the cross bar 11 is moved towards the left the two pivot points 17 and 19 are brought closer together and the two shoe beams 12 are moved toward each other and toward the rail 15. If now, there were a car wheel between the shoe beams 12 the spring 21 would be further compressed to an extent depending on the extent of movement of the cross bar 11 and the thickness of the car wheel between the shoe beams.

These shoe beams in practice are preferably constructed of suitable cast steel alloy, giving them the strength required and permitting them to be readily shaped as shown with suitable re-enforcing rib, etc. These shoe beams 12 are provided with a seat 12b on which the brake shoe 26 is adapted to rest and have a downwardly projecting hook 12d engaging the ear 9b. These brake shoes 26 are fastened to the shoe beams 12 by being provided with threaded holes (see Figs. 1, 3 and 6) which are adapted to receive cap screws 27. These cap screws 27 are made accessible through holes 28 in the shoe beams 12 reinforced by inwardly projecting ribs 12c as originally cast. These brake shoes 26 are preferably constructed of rolled steel and manufactured by the same process used in the manufacture of steel track rails. These brake shoes 26 are preferably shaped as shown so as to leave a comparatively narrow braking surface, the lower extreme edge of which is slightly above the edge of the track rail. These brake shoes 26 are constructed in this manner for two reasons, (1st) in order to make the shoe pressure very high per unit area thereby increasing the frictional resistance per unit of contact area of the brake shoe and apply it at an advantageous point, and (2nd) the braking surface of the brake shoes are not allowed to project below the top of the rail, so that each moving car wheel will engage the entire braking surface of the brake shoes and thereby will wear the brake shoes uniformly and will not leave a ridge on which other car wheels having differently shaped treads may ride.

For reasons heretofore mentioned, and in accordance with the apparatus thus far described, there is no fixed position which a particular shoe beam 12 should assume when there is no car wheel at that point in the retarder, because the shoe beams 12 may float, so to speak, in response to movement of the operating arms 16 and 18 having their lower ends connected by springs 21. In other words, both of the shoe beams 12 might be moved towards the left or towards the right from the position in which they are shown (see Fig. 2) and they would remain in such position were it not for supplemental means presently described. Referring to Figs. 4 and 5, it should be noted that the cross bar 11 and its associated operating arms 16 and 18 and spring 21 are supported for transverse sliding movement by lips 32$^b$ and 32$^c$ of the bracket 32 riding on the ear 9$^a$ and tie plate 33, respectively.

In order to require these shoe beams 12 to assume a normal position, having a definite alignment with the track rail with which they are associated, an aligning spring 30 is provided for each spring 21. This aligning spring 30 (see Fig. 3) is supported about a guide bolt 31 which guide bolt is slidably supported in the bracket 32 supporting the pin 19. This centering spring 30 has sufficient initial or trapped compression to maintain the associated shoe beam as far to the left with respect to the cross bar 11 as is permitted until the bearing surface or stop lug 18$^c$ engages the upstanding part 32$^a$ of the bracket 32. The guide bolt 31 is provided with lock nuts 35 which serve to prevent the trapped compression of the centering spring 30 to escape. These lock nuts 35 do not come into play during operation of the retarder, but only come into play when the shoe beam 12 associated therewith is removed, the head of the guide bolt 31 in practice engaging the inner wall of the shoe beam 12 thereby maintaining a fixed relation between this shoe beam and the cross bar 11 so long as there is no car wheel in the retarder.

This centering spring 30 and the associated mechanism, as well as the main spring 21 are made accessible by opening the retarder. This is accomplished by separating the shoe beams 12 to an extent beyond the normal zero or open position of such retarder, in which event the guide hooks 12$^a$ of the shoe beams 12 (see Figs. 5 and 6) disengage the ears 9$^b$ of the guide blocks 9. With the retarder open to this extent the shoe beams 12 may be pried or lifted upwardly and removed without any difficulty, thus exposing the more or less intricate mechanism of the retarder.

Attention is particularly directed to the fact that this retarder does not expose any of the less rugged parts, which might be damaged by dragging equipment or a derailed car, above the top of the ties, and that all parts projecting above the ties are sufficiently rugged to withstand derailment in the event that this should occur, bearing in mind however that the apparatus has been particularly designed to avoid derailment due to climbing out of car wheels from between the brake shoes.

Having now described the retarder as a whole let us consider the operating mechanism whereby the plurality of cross bars 11 are simultaneously operated in one direction or the other.

Referring to Fig. 1 the side of the retarder containing the operating mechanism is provided with a thrust plate 40 of heavy flat iron, which is bolted to the top of the various I-beams 1 and ties 2. Directly below this thrust plate 40 and spaced therefrom a suitable distance as by spacing sleeves 41 (see Fig. 9) is a thrust angle bar 42. The manner in which this thrust plate 40 and thrust angle bar 42 are fastened to the wooden ties is most clearly shown in Fig. 9 of the drawings. The wooden tie 2 is notched as shown into which notch the thrust angle bar 42 and the thrust plate 40 are bolted, spaced apart by the spacing sleeve 41 and held together by a bolt and nut 43. The manner in which the thrust plate and bar are secured to the steel I-beam is more clearly shown in Figs. 7 and 8 of the drawings. The steel I-beam 1 is slotted as shown at 1$^a$, below which slot a piece of angle iron 1$^b$ is riveted or welded thereto, the thrust angle bar 42 being bolted to this piece of angle iron 1$^b$ by a bolt 44. The thrust plate 40 is bolted to the I-beams 1 by bolts 46 and spaced therefrom by spacers 45. Between this thrust plate 40 and thrust angle bar 42 are pivotally supported, by the fixed pivot pin 48 (see Figs. 1 and 2), a plurality of double angle levers 49. These double angle levers 49 have their long free ends pivotally connected to an operating bar 50. The short end of these double angle levers 49 are spaced apart by the enlarged ends 11$^a$ of the cross bars 11, and are pinned thereto by a headless pin 51 (see Figs. 1 and 2), so that longitudinal movement of the operating bar 50 causes transverse movement, but at a much slower rate, of the cross bars 11. It is of course understood that the headless pin 51 is maintained in its position by its ends engaging the thrust plate and bar 40 and 42.

By reason of the fact that the forces transmitted by each of the cross bars 11 runs into many tons the operating mechanism for operating all of these cross bars at the same time must necessarily be capable of transmitting very large forces, this being especially true with a car in the retarder and the retarder operated to the 3rd or 4th position. It is well to point out at this time that the retarder is, as a rule, closed to the desired point before the car enters, in this event the cross rods move quite easily. On the other hand it is at times necessary to increase the brake shoe pressure after a car has entered in which event the motive power means must supply the forces to compress the springs 21. This requirement of increasing the braking pressure with a car in the retarder occurs most commonly when a large number of cars is classified in a single cut, of which some cars are light and others are heavy. In order to give the motive power means, which consists of a motor 56 in the particular arrangement shown which through suitable gearing drives the wheel 54 containing a crank pin 54ª, an operating advantage as the braking is increased, the parts are so proportioned that the pitman rod 60 moves through a much shorter distance per revolution of the motor 56 at the 3rd and 4th position of the operating mechanism 55 than it does near the first and second position of this mechanism. In order to further give the operating mechanism an advantage as the retarder is closed up, a multiplying angle lever 61 pivotally supported between two brackets 62 by a headed pin 63 is provided. The short leg of this multiplying angle lever is preferably bifurcated and has this bifurcated end pivotally connected as by a pin 65 to the knuckle 66. This knuckle is threadedly connected to the pitman rod 60 and locked in position by lock nuts 67. The longer leg of this multiplying angle lever 61 is similarly bifurcated and is pinned as by a pin 64 to the operating rod 68. The other end of this operating rod 68 is adjustably connected, as between lock nuts 69, to a trunnion 70 comprising a sleeve having journal pins 70ª projecting therefrom on opposite sides thereof. A double lever arm 72 having its one end pivotally connected between the thrust plate 40 and the thrust angle bar 42 as by a pin 73, straddles the operating bar 50 and the trunnion 70, and is pivotally connected to this operating bar 50, as by a bolt 74, and is pivotally connected to the trunnion 70 by journals engaging the journal pins 70ª. The operating bar 50 may be spliced at intervals as indicated at 74ª.

From this construction it is readily apparent that when the operating mechanism assumes the zero or wide open position the effective length of the short arm containing pin 65 of the multiplying angle levers 61 is very short and the effective length of the longer arm containing pin 64 of this multiplying angle lever is very long, as illustrated by the dotted position of this multiplying angle lever 61. Further, the effective length of the short arm of this angle lever 61 increases and the effective length of the longer arm of this multiplying angle lever decreases as the operating mechanism advances from the zero position towards the 4th position. In other words, not only is the operating ratio between the motor 56 and the operating bar 50 changed by reason of the arc through which the pin 54ª of the operating mechanism operates, but this operating ratio is further changed by the position assumed by the multiplying angle lever 61. This operating ratio is in fact changed more than one hundred fold, and as the pins 63, 64 and 70ª get into alignment the operating ratio reaches infinity. In Fig. 1 of the drawings the retarder has been shown in the 4th, or fully closed, position. The double arm lever 72 practically doubles the force exerted on operating bar 50 as compared with the force exerted by operating rod 68. This lever 72 is used to further multiply the forces exerted and in order to neutralize, to a certain extent at least, the transverse or shearing force exerted upon the thrust plates 40 and 42 by the various angle levers 49.

The standard dimensions of freight car trucks between axles of the same truck is 5 feet and 6 inches, and it has been found by extensive experimentation that the best results are obtained when using articulated retarder shoe beams, such as shown, to have the effective length of these shoe beams exactly the same as the spacing between car axles, namely, 5 feet 6 inches, and this brake shoe length has been adopted in the retarder shown. It has been found as a result of tests of retarders using articulated shoe beams having many different lengths different from 5 feet 6 inches, that the length adopted namely 5 feet 6 inches gives the maximum retardation per unit lifting effort. This is because the pressure exerted on the two wheels of a truck running on the same rail are the same at all times, that is, the total pressure is never divided unequally between two wheels of a truck running on the same rail. From this it appears that the average maximum pressure exerted per two axles of a truck is the same as the maximum pressure exerted per axle on a truck. Also, since the shoe beams length is the same as the wheel spacing the presence of one car axle with its wheels in the retarder does not materially change the braking forces exerted upon another car wheel. There is still another advantage, it is believed, which reduces the lifting or climbing out tendency when shoe beams of 5 feet 6 inches length are employed, namely, that the first wheel of a truck is not required to spread the shoe beams as much as when shorter shoe beams are employed. It is of course understood that if longer articulated shoe beams are employed the maximum shoe pressures are higher as compared with the average shoe pressures, and for this reason the shoe beams should not be longer, it is believed, than the spread between axles of a freight car truck. Also, the number of cross rods 11 used for shoe beam 12 and the points at which these cross rods act on the shoe beams is an important consideration to obtain the highest average braking pressure per maximum braking pressure as a car moves through the retarder. After extended experimentation and calculation these points have been selected as shown in the drawings, in which these points are located 11 inches from the end of the shoe beam proper.

By looking at Fig. 2 it immediately becomes apparent that if a truck has been caused to climb out between the brake shoes and in so doing has been caused to ride upon the outside brake shoes, the pressure exerted upon the inside or flange side of the wheel immediately drops to substantially zero, that no further braking effort is exerted upon the inside of these wheels, and for this reason there is no tendency for the wheel flanges to climb out. In other words the outside shoe beams, under the condition assumed, now perform the function of the track rail itself, and when the car reaches the end of the retarder it will drop back on the rail and no derailment will result. In a recent test, in order to determine the strength of the retarder and its action, the retarder was closed up to such an extent as to cause a freight car loaded to 90 tons to climb out and ride upon the top of the shoe beams and brake shoes, and when it reached the end of the retarder it dropped back on the track rails without damaging either the retarder or the car and lading.

As already mentioned generally, the present retarder is one of the equalized type, this equalization being accomplished in an extremely simple, rugged and inexpensive way. This equalization substantially removes all tendency of the retarder to pull car wheels off of car axles even though the spacing between car wheels on their axles is not entirely uniform, as experienced in practice. This equalization is accomplished (see Fig. 2) by reason of the fact that the pressures on opposite sides of a car wheel for reasons already given are substantially the same, and for this reason there is just as much tendency to push the wheels toward each other, of a single axle, as there is tendency to spread these wheels. This feature is extremely important for two reasons, namely, to prevent damage to car trucks and to prevent car wheels including their flanges to climb entirely out of the top causing derailment, as already explained above.

It should be noted that the retarder under consideration is extremely simple as far as adjustment is concerned. Individual adjustment of spring compression of springs 21 is obtained by inserting the necessary number of spacing washers or shims 24, and individual adjustment of the spacing between brake shoes for a particular retarder position may be made by changing the lock nuts 22. An over-all adjustment of the spacing between brake shoes and a particular retarder postion may be made by changing the position of lock nut 69 on the operating rod 68.

The present invention does not require any particular type of motive power operating mechanism, except that the operating mechanism should be of a type which will operate the retarder to any one of a large number of different precise operating positions. This operating mechanism may be either pneumatic, hydraulic or electric, and has been shown conventionally as comprising an electric motor 56 driving a crank pin 54$^a$ to any one of five different positions.

Referring to Fig. 5 attention is called to the manner in which the shoe beams 12 slidably engage the guide members or ears 9$^b$ of the chairs or guide blocks 9. It is desired to point out in this connection (see Fig. 6) that if the shoe beam 12 is moved outwardly about 2 inches beyond the zero position (extreme open position) of the retarder that the shoe beams 12 may be lifted directly upwardly, so as to cause the dovetailed articulated connection between adjacent shoe beams to be disengaged after which the shoe beams may be slid sidewise to expose the more intricate and less rugged mechanisms, such as the operating arms 16 and 18, springs 21 and 30, and the like. It may be pointed out here that the retarder may be operated to such sub-normal position by first operating the retarder to the zero position, then remove pin 64 and operate the operating mechanism to about the third position, then align the rod 68 with the second opening 77 and reinsert the pin 64, and then again operate the operating mechanism to the zero position. This ready removal of the shoe beams is provided to facilitate lubrication, inspection and replacement of parts.

It is of course understood that when car wheels move through a retarder at a comparatively high speed that additional stresses are set up in the parts due to the inertia of the moving parts. These stresses may at times be quite high and at other times may be very detrimental to the efficiency of the retarder, the latter being especially true if the forces due to inertia of moving parts either cause less braking than would otherwise result or cause excessive braking and thereby cause climbing out of the car wheels. It is believed that the objectionable effects resulting from the inertia of moving parts have been reduced to a minimum in the retarder construction embodying the present invention, and that the braking characteristics are practically the same through a wide range of car speeds. In fact tests of the retarder shown have shown exceptional performance and this is believed to be due in part, at least, to the elimination of undesirable forces caused by the inertia of parts moved in response to a moving car.

It is desired to be understood that, since the retarder shown and described is of a construction wherein the retarder of one rail is quite independent of the retarder for the other rail, this retarder is applicable to one rail of the track only. On the other hand if desired it may be applied to three or more substantially paralleled track rails. It is of course understood that the retarder embodying the present invention may be partially opened by the operator when he experiences lifting of some of the car wheels.

Having thus shown and described in considerable detail one embodiment of the present invention, which embodiment is illustrative of a car retarder already in operation in a railway classification yard, it is desired to be understood that modifications, changes and additions may be made to adopt the retarder to the various conditions encountered in practicing the invention, all without departing from the spirit, nature or scope of the invention, except as demanded by the scope of the following claims.

What I claim is:—

1. In a car retarder of the track brake type in which brake shoes engage the sides of moving car wheels, shoe beams on opposite sides of a rail supported only for movement transverse to such rail, a member supported for movement about a fixed pivot having one end thereof engaging one of said shoe beams, another member supported for movement about a movable pivot having one end thereof engaging the other shoe beam, a spring acting on said members to urge said shoe beams toward each other, and means for changing the position of said movable pivot, whereby the force tending to move the shoe beams toward each other may be varied by varying the location of said movable pivot and whereby the forces exerted on said shoe beams bear a fixed ratio for all locations of said movable pivot.

2. In a car retarder of the track brake type in which brake shoes engage the sides of moving car wheels, shoe beams on opposite sides of a rail supported for movement transverse to the rails only, those at each side having their abutting ends connected together by an articulate connection not permitting relative transverse movement, a member supported for movement about a fixed pivot having one end thereof engaging one of said shoe beams, another member supported for movement about a movable pivot having one end thereof engaging the other shoe beam, a spring acting on said members to urge said shoe beams toward each other, and means for changing the position of said movable pivot, whereby the force tending to move the shoe beams toward each other may be varied by varying the location of said movable pivot and whereby the forces exerted on said shoe beams are balanced for the various positions of said movable pivot.

3. In a car retarder of the track brake type in which brake shoes engage the sides of moving car wheels, shoe beams on opposite sides of the rails supported for movement transverse to said rails only, the beams at each side of the rails having their abutting ends connected together by an articulate connection not permitting relative transverse movement, means for moving said shoe beams toward each other, said means being constructed so that the force of engagement of the brake shoes on opposite sides of a car wheel is substantially the same regardless of variation of the spacing of the car wheels on the axle.

4. In a car retarder of the track brake type in which brake shoes engage the sides of moving car wheels, shoe beams on opposite sides of a rail supported for movement transverse to said rail only, a member supported for movement about a fixed pivot having one end engaging one of said shoe beams, another member supported for movement about a movable pivot having one end engaging the other shoe beam, a spring disposed between said members to urge said shoe beams toward each other, an aligning spring for determining the normal position of the shoe beams on opposite sides of said rail with respect to such rail, and means for changing the position of said movable pivot, whereby the shoe beams at all times if there is no car in the retarder are arranged in alignment with their associated rail irrespective of the position of the movable pivot and whereby the forces exerted by shoe beams acting on the same car wheel bear at all times a fixed ratio.

5. In a car retarder of the track brake type in which brake shoes engage the sides of moving car wheels, shoe beams on opposite sides of a rail supported for movement transverse to such rail only and all those common to a side having their abutting ends connected together by an articulate connection not permitting relative transverse movement, a member supported for movement about a fixed pivot having one end thereof engaging one of said shoe beams, another member supported for movement about a movable pivot having one end thereof engaging the other shoe beam, a spring disposed between said members to urge said shoe beams toward each other, an aligning spring for determining the normal position of said shoe beams with respect to such rail, and means for changing the position of said movable pivot, whereby the shoe beams at all times if there is no car in the retarder are arranged in alignment with their associated rail and whereby the forces exerted on shoe beams acting on the same car wheel are equal irrespective of the position of said movable pivot.

6. In a car retarder of the track brake type in which brake shoes engage the sides of moving car wheels, shoe beams on opposite sides of a rail supported for movement transverse to the rails only, said shoe beams being arranged in pairs on opposite sides of each rail with their ends in alignment transversely to the rails, means associated with the shoe beams for urging said shoe beams toward each other and mounting them for movement free of any obstacles for causing them to exert equal forces against the sides of a car wheel irrespective of the exact location of such car wheel to the normal position of such shoe beams, whereby the braking forces on opposite sides of a car wheel are equalized and there is no tendency to force a car wheel off of its axle.

7. In a car retarder of the track brake type in which brake shoes engage the sides of moving car wheels, shoe beams on opposite sides of the rails supported only for movement transverse to the rails, those on each side having their abutting ends connected together by an articulate connection not permitting relative transverse movement, said shoe beams being arranged in pairs on opposite sides of the rails with their ends in alignment transversely to the rails, means associated with each end of each pair of shoe beams for urging said shoe beams toward each other and exerting equal forces against the sides of a car wheel irrespective of the exact location of such car wheel to the normal position of such shoe beams, whereby the braking forces on opposite sides of the two car wheels on the same axle are equalized and there is no tendency to force a car wheel off of its axle.

8. Operating means for car retarders of the type in which brake shoes along the track engage opposite sides of moving car wheels moving on such track, comprising, in combination, operating mechanism and car retarding means mounted on the ties of a railway track, an angle lever pivotally supported with respect to the ties of such railway track and having two arms radiating from its pivotal support, a pitman rod connecting the free end of one of said arms to said operating mechanism, an operating rod connecting the free end of the other arm of said angle lever to said retarding means, the direction of force exerted on said one arm being such as to increase the effective length of the lever arm as the angle lever is operated and the direction of force exerted by the other arm of said angle lever on the car retarding means being such as to decrease the effective length of the lever arm as the angle lever is operated, whereby the effective operating ratio of said operating mechanism upon said car retarding means is rapidly increased as the brake shoes of such car retarding means are brought toward each other.

9. In combination with a car retarder of the track brake type in which opposite sides of moving car wheels are engaged by track way brake shoes and having an operating bar, operating mechanism including a pitman rod, and variable ratio connecting means connecting said pitman rod and operating arm, said means functioning to increase the force exerted per unit force applied as the brake shoes of the car retarder are brought into operative position.

10. In a car retarder of the track brake type in which brake shoes engage the sides of moving car wheels, shoe beams on opposite sides of a rail supported for movement transversely to the track rails only, operating means for operating said shoe beams to normal open position and extreme closed and a plurality of intermediate positions, the supporting means for the shoe beams permitting only transverse movement thereof being so constructed that verticle movement is permitted if the shoe beams are separated beyond their normal open position to abnormal position, and means including said operating means for opening said shoe beams to abnormal position.

11. In a car retarder of the track brake type in which brake shoes engage the sides of moving car wheels, shoe beams on opposite sides of the track rails supported for movement transverse to the rails only and having their abutting ends connected together by an articulate connection not permitting relative transverse movement, operating means for operating said shoe beams to normal open position and extreme closed and a plurality of intermediate positions, the supporting means for the shoe beams permitting only transverse movement thereof being so constructed that verticle movement is permitted if the shoe beams are separated beyond their normal open position to abnormal position, and means including said operating means for opening said shoe beams to abnormal position.

12. In a car retarder of the track brake type in which opposite sides of a moving car wheel are engaged by track mounted brake shoes, upstanding arms on opposite sides of a track rail movable toward and away from such track rail, means for simultaneously operating said arms toward or away from said rail, shoe beams having means for engaging said arms when such shoe beams are placed in position, chairs on which said shoe beams rest when in position, inter-engageable means partly on said chairs and partly on said shoe beams for permitting transverse movement of said shoe beams only when said shoe beams assume any one of the operating positions, whereby said arms prevent disengagement of said shoe beams and chairs, and said interengageable means prevent said shoe beams from being lifted off of said arms.

13. A car retarder of track brake type comprising, railway ties, rails mounted on said ties, operating arms projecting up through between the ties on opposite sides of said rails, and shoe beams of inverted box-like construction covering said arms and establishing an operative connection with said arms when in position.

14. A car retarder of track brake type comprising, railway ties, rails mounted on said ties, operating arms projecting up through between the ties on opposite sides of said rails, shoe beams of inverted box-like construction covering said arms and establishing an operative connection with said arms when in position, and interengageable means partly on said shoe beams and partly secured to said ties to permit transverse movement of said shoe beams with respect to said rails only.

15. A car retarder of track brake type comprising, railway ties, rails mounted on said ties, operating arms projecting up through between the ties on opposite sides of said rails, shoe beams of inverted box-like construction covering said arms and establishing an operative connection with said arms when in position, and brake shoes of angular cross-sectional configuration detachably secured to said shoe beams.

16. A car retarder of track brake type comprising, railway ties, rails mounted on said ties, operating arms projecting up through between the ties on opposite sides of said rails, shoe beams of inverted box-like construction covering said arms and establishing an operative connection with said arms when in position, and brake shoes of angular cross-sectional configuration detachably secured to said shoe beams, said brake shoes being constructed of rolled steel and having threaded openings through the medium of which they are detachably secured to said shoe beams.

17. In a car retarder of the track brake type in which brake shoes engage the sides of moving car wheels, shoe beams on opposite sides of a rail supported for movement transverse to the rails only, said shoe beams being arranged in pairs on opposite sides of each rail with their ends in alignment transversely to the rails, means associated with each end of each pair of shoe beams for urging said shoe beams toward each other and exerting equal forces against the sides of a car wheel irrespective of the exact location of such car wheel to the normal position of such shoe beams, whereby if a car wheel is caused to climb out between the brake shoes to the point where only the flange of the wheel is engaged by a brake shoe the braking effort is released and the flange will remain between the brake shoes and no derailment will result.

18. In a car retarder of the track brake type in which brake shoes engage the sides of moving car wheels, shoe beams on opposite sides of the rails supported only for movement transverse to the rails, those on each side having their abutting ends connected together by an articulate connection not permitting relative transverse movement, said shoe beams being arranged in pairs on opposite sides of the rails with their ends in alignment transversely to the rails, means associated with each end of each pair of shoe beams for urging said shoe beams toward each other and exerting equal forces against the sides of a car wheel irrespective of the exact location of such car wheel to the normal position of such shoe beams, whereby the braking forces on opposite sides of the two car wheels on the same axle are equalized and consequently the extent of wear on the brake shoes on both sides of a rail is the same.

19. In a track brake type car retarder, in combination, a brake shoe positioned one at each side of a track rail, a means for moving each shoe relatively to the rail, a connection between said shoes arranged to transmit pressure from one shoe to the other to substantially equalize pressures on the shoes at all times, and means for adjusting the braking effect of said shoes on a car wheel passing therebetween.

20. In a track brake type car retarder, in combination, a brake shoe positioned one at each side of a track rail, a pivoted means for moving each shoe relatively to the rail, an elastic connection between said shoes arranged to transmit pressure from one shoe to the other to substantially equalize pressures on the shoes at all times, and means for adjusting the braking effect of said shoes on a car wheel passing therebetween.

21. In combination with a car retarder of the track brake type, operating means for moving brake shoes toward and away from the track rails, comprising, a toggle joint, a driven member for closing the toggle joint, a driving member, and lever means operatively interconnecting the driving and driven members.

22. In combination with a car retarder of the track brake type, operating means for moving brake shoes toward and away from the track rails, comprising, a toggle joint, a driven member for closing the toggle joint, a driving member, and lever means operatively interconnecting the driving and driven members, the parts being so arranged that the mechanical advantage of the driving member in driving the driven member increases as the toggle joint is moved toward closed position.

In testimony whereof I affix my signature.

WINTHROP K. HOWE.